(12) United States Patent
Kirsten et al.

(10) Patent No.: US 10,525,602 B2
(45) Date of Patent: Jan. 7, 2020

(54) AUTOMATION COMPONENT OR CLAMPING DEVICE HAVING A PISTON

(71) Applicant: SCHUNK GMBH & CO. KG SPANN-UND GREIFTECHNIK, Lauffen am Neckar (DE)

(72) Inventors: Benjamin Kirsten, Brackenheim (DE); Samuel Wuetherich, Pfaffenhofen (DE); Michael Franz, Ilsfeld (DE)

(73) Assignee: SCHUNK GMBH & CO. KG SPANN-UND GREIFTECHNIK, Lauffen am Neckar (DE)

( * ) Notice: Subject to any disclaimer, the term of this patent is extended or adjusted under 35 U.S.C. 154(b) by 0 days.

(21) Appl. No.: 15/761,860

(22) PCT Filed: Sep. 2, 2016

(86) PCT No.: PCT/EP2016/070780
§ 371 (c)(1),
(2) Date: Mar. 21, 2018

(87) PCT Pub. No.: WO2017/050544
PCT Pub. Date: Mar. 30, 2017

(65) Prior Publication Data
US 2018/0264659 A1   Sep. 20, 2018

(30) Foreign Application Priority Data
Sep. 21, 2015 (DE) .......................... 10 2015 218 063

(51) Int. Cl.
*B25J 15/02* (2006.01)
*B23Q 7/04* (2006.01)
*F15B 15/14* (2006.01)

(52) U.S. Cl.
CPC .......... *B25J 15/0253* (2013.01); *B23Q 7/043* (2013.01); *F15B 15/1419* (2013.01)

(58) Field of Classification Search
CPC ........ B25B 5/101; B25B 5/02; B25J 15/0028; B25J 15/02; B25J 15/026; B25J 15/083;
(Continued)

(56) References Cited

U.S. PATENT DOCUMENTS 4,707,013 A * 11/1987 Vranish ................. B25J 15/026
294/119.1
4,808,898 A *  2/1989 Pearson ................. B25J 9/1015
294/119.1
(Continued)

FOREIGN PATENT DOCUMENTS

CN   1114011 A   12/1995
CN   1416382 A    5/2003
(Continued)

OTHER PUBLICATIONS

International Search Report and Written Opinion Form PCT/ISA/210 and PCT/ISA/237, International Application No. PCT/EP2016-070780, p. 1-10, International Filing Date Sep. 2, 2016, dated Dec. 12, 2016.
(Continued)

*Primary Examiner* — Stephen A Vu
(74) *Attorney, Agent, or Firm* — Bond Schoeneck & King, PLLC; George McGuire

(57) ABSTRACT

An automation component or clamping device includes a basic housing, at least one jaw movably guided in a jaw guide of the basic housing, and a piston movably guided in the basic housing, wherein the piston has a piston surface, wherein the piston is coupled in terms of movement to the jaw, and wherein a piston rod extending on the piston transversely with respect to the piston surface, wherein the centroid of the piston surface is spaced apart from the central longitudinal axis of the piston rod.

12 Claims, 3 Drawing Sheets

(58) Field of Classification Search
CPC ... B25J 15/0253; B23Q 7/043; F15B 15/1419
See application file for complete search history.

(56) References Cited

U.S. PATENT DOCUMENTS

| | | | |
|---|---|---|---|
| 6,331,758 B1 * | 12/2001 | Takanashi | B25J 15/028 318/560 |
| 2009/0184528 A1 | 7/2009 | Maffeis | |
| 2015/0021949 A1 * | 1/2015 | Schuster | B25J 15/02 294/207 |
| 2018/0085929 A1 * | 3/2018 | Zimmer | B25J 15/0253 |

FOREIGN PATENT DOCUMENTS

| | | |
|---|---|---|
| DE | 3120157 A1 | 12/1982 |
| DE | 102008057307 A1 | 5/2009 |
| DE | 102010021247 A1 | 11/2011 |
| FR | 2124200 A1 | 9/1972 |
| WO | 0168328 A1 | 9/2001 |
| WO | 2010028145 A1 | 3/2010 |
| WO | 2015070840 A1 | 5/2015 |

OTHER PUBLICATIONS

Non-translated Chinese Office Action dated May 27, 2019, pp. 1-8.

* cited by examiner

AUTOMATION COMPONENT OR CLAMPING DEVICE HAVING A PISTON

CROSS-REFERENCE TO RELATED APPLICATIONS

This application is the United States National Phase Entry of PCT Application No. PCT/EP2016/070780 filed Sep. 2, 2016, which claims priority to German Application No. 10-2015-218063.8 (DE), filed Sep. 21, 2015, the entire disclosure of each of which is incorporated herein by reference.

The invention relates to an automation component or clamping device comprising a basic housing, at least one jaw movably guided in a jaw guide of the basic housing, a piston movably guided in the basic housing, the piston having a piston surface, and a piston rod extending on the piston transversely with respect to the piston surface, the piston being coupled in terms of movement to the jaw. The invention also relates to an associated piston.

A great variety of such automation components are known from the prior art. In particular gripping devices, linear modules or shafts, conveyors or lifting devices or the like are possible as automation components.

In order to maximize the piston force (piston force=piston surface×pressure), as large a piston surface as possible is required.

For example, EP 1 263 554 B1 discloses an automation component in the form of a parallel gripper comprising a basic housing and two adjustable jaws that are movably mounted in the basic housing in a jaw guide. In this case the jaws are adjustable by means of a wedge-hook transmission, the wedge-hook transmission being adjustable by means of an oval piston that is guided in the basic housing.

In this case, providing an oval piston makes it possible for an increased piston surface to be provided, the centroid of the piston surface coinciding with the central longitudinal axis. A tilting moment can thus be eliminated. However, such a design of the piston is very restricted due to structural considerations.

DE 10 2010 021247A1 discloses an automation component having the features of the preamble of claim 1.

The object of the invention is that of overcoming the mentioned disadvantages of the prior art.

This object is achieved by, among other things, the centroid of the piston surface is spaced apart from the central longitudinal axis of the piston rod. In this case, in a plan view of the piston surface, the centroid is inside the periphery of the piston rod. Although, as a result of the spacing of the centroid from the central longitudinal axis, a tilting moment arises in the event of actuation, due to acting inside the periphery of the piston rod said moment is introduced directly into the piston rod and can thus be accepted.

The basic housing can in particular comprise a cylinder having a cylinder wall formed by the basic housing. A piston-cylinder unit is thus provided that is designed as a hydraulic or pneumatic adjustment device for the jaw. The piston or the piston rod can be coupled in terms of movement to the jaw for example by means of a wedge hook arranged on the piston rod, such that the jaw can be adjusted by means of a wedge-hook transmission.

It is conceivable for the piston surface to be asymmetrical, i.e. for no element of symmetry to be present. As a result, the best possible use can be made of the available surface of the basic housing. It is also conceivable, however, for the piston surface to have an axis of symmetry, the centroid being located on the axis of symmetry. If there is an axis of symmetry, the centroid is known to always be located on the axis of symmetry. In this case, it has been found to be particularly advantageous for the axis of symmetry to extend transversely with respect to the direction of movement of the jaw. A tilting moment of the piston transversely with respect to the direction of movement thus has a particularly small negative effect.

In this case, it is conceivable in particular for the piston surface to widen from an elliptical shape towards a small semi-major axis. The small semi-major axis can in particular extend transversely with respect to the direction of movement of the jaw. In this case, the small semi-major axis corresponds to the shortest half diameter of the piston, while the large semi-major axis corresponds to the largest half diameter of the piston.

It is conceivable for the piston rod to be circular-cylindrical and for the spacing between the centroid and the central longitudinal axis to be from 2% to 10%, in particular 6% to 9%, of the diameter of the piston rod. The piston rod can in particular have a diameter of from 14 mm to 18 mm, in particular 16 mm, it being possible for the centroid to be spaced apart from the central longitudinal axis by from 0.5 mm to 1.5 mm, in particular 1 mm.

The piston may have a polygonal outer contour in plan view, and this also allows the best possible use to be made of the available basic housing surface. In order to achieve better sealing, the corners may be rounded.

In this case, the outer contour can describe a curve, the curvature of which is aligned at every point, i.e. has the same sign, and/or the curvature of which is not zero at any point, a curvature of zero corresponding to a straight line. Furthermore, the individual segments describing the outer contour may have transitions having a constant tangent and/or a constant curvature and/or a constant curvature change.

The centroid may be spaced apart from the central longitudinal axis in parallel with and/or transversely with respect to the direction of movement of the jaw. However, it has been found to be particularly advantageous for the centroid to be spaced apart from the central longitudinal axis only transversely with respect to the direction of movement of the jaw. In this case, a tilting moment of the piston has a particularly small influence.

In particular, the centroid can be spaced apart from the central longitudinal axis in parallel with and/or transversely with respect to a housing wall of the basic housing.

The object is also achieved by a piston for an automation component or clamping device according to the invention. In particular, the invention is achieved by a piston for an automation component or clamping device according to the invention, which piston has a piston rod arranged thereon. In this case, the centroid of the piston surface of the piston is spaced apart from the central longitudinal axis of the piston rod.

Further details and advantageous embodiments of the invention can be found in the following description, on the basis of the embodiments of which the invention will be described and explained in greater detail.

BRIEF DESCRIPTION OF THE DRAWINGS

In the drawings:

FIG. 1 shows a gripping device 2 designed as a parallel gripper. Said gripping device comprises a basic housing 4 comprising a jaw guide 8, extending in the longitudinal direction 6, for two gripper jaws 10 (cf. FIG. 3) that can be inserted into the jaw guide 8 in the longitudinal direction 6 and movably mounted therein. In this case, the longitudinal direction 6 also corresponds to the direction of movement 6. Mounting openings for releasably attaching gripper finger elements in the broadest sense of the term are provided on an upper face of the gripper jaws 10, but are not intended to be described in further detail here.

DETAILED DESCRIPTION

Sensor slots 40 are provided on the basic housing 4, at which slots position sensors can be arranged.

Figure 1:
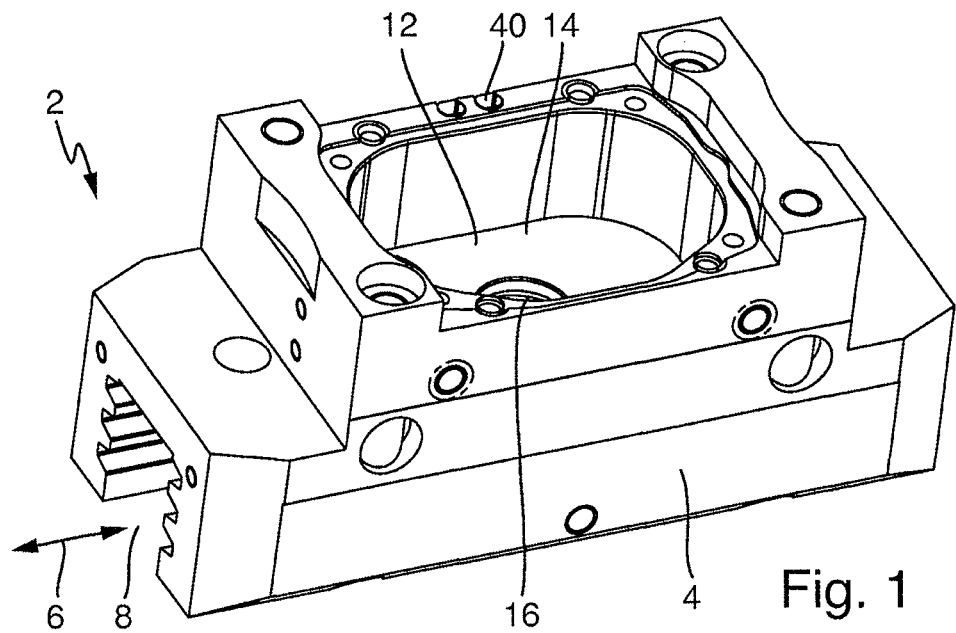
FIG. 1 is a perspective view of an automation component in the form of a parallel gripper without a base plate, piston or jaws.
Figure 2:
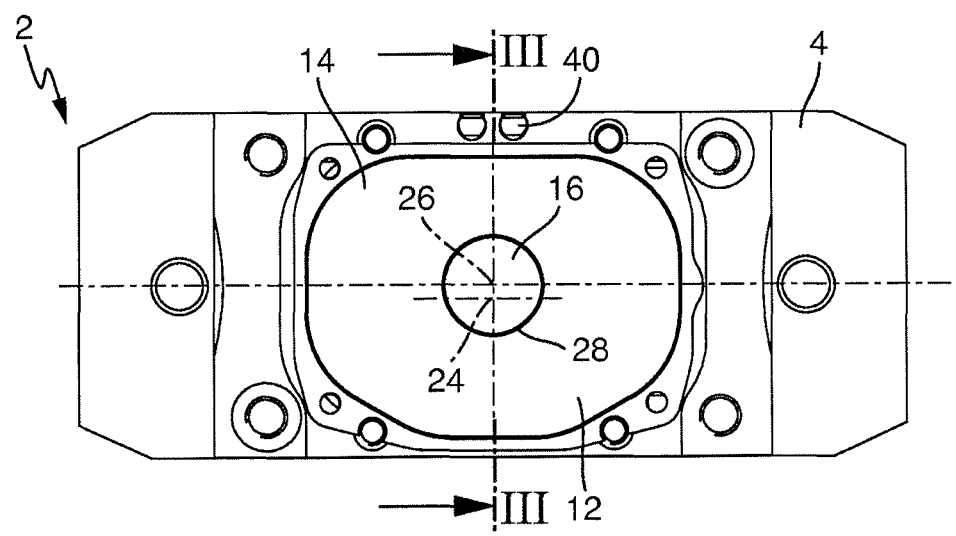
FIG. 2 is a plan view of the parallel gripper according to FIG. 1.
Figure 3:
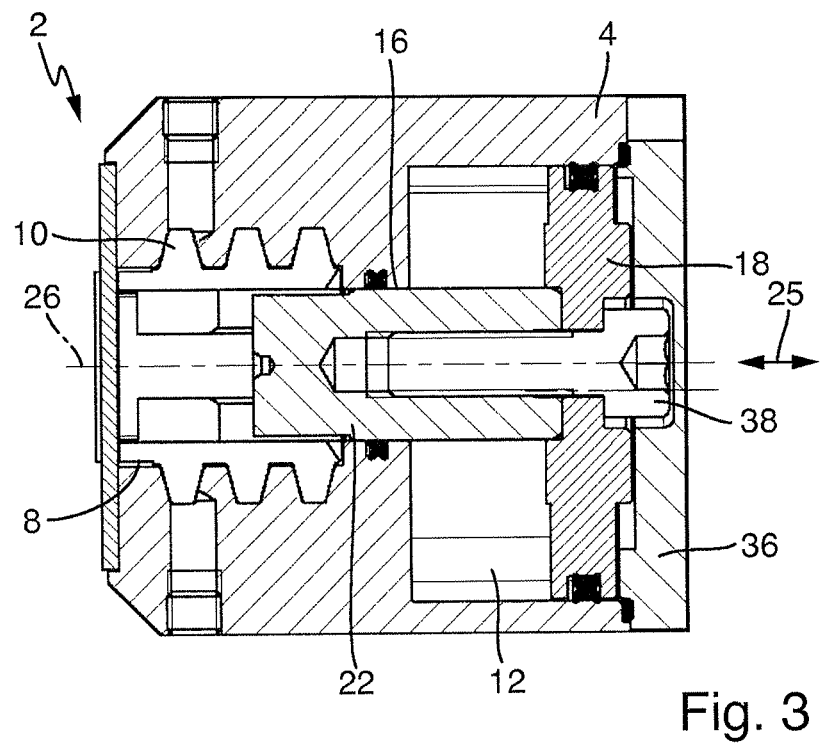
FIG. 3 is a cross section through the parallel gripper according to FIG. 2, along the line and showing the base plate, piston and jaws.

As can further be seen from FIGS. 1 to 3, a cylinder chamber 12 is provided in the basic housing 4, the cylinder base 14 of the cylinder chamber 12 comprising an opening 16 leads into the jaw guide 8. It can be seen in FIG. 3 that a piston 18 is movably guided in the cylinder chamber 12.

As can be seen in FIGS. 3 to 6, the piston 18 comprises a piston surface 20. Said surface corresponds to the surface occupied by the piston periphery or by the surface transverse to the direction of movement 25 of the piston 18, which surface is occupied by the cylinder wall. A piston rod 22 is arranged on the piston 18, which piston rod extends transversely with respect to the piston surface 20. The piston rod 22 penetrates the opening 16 in the base 14 of the cylinder chamber 12. The cylinder chamber 12 is closed by a cylinder cover 36. The piston rod 22 is screwed to the piston 18 by means of a screw 38.

Figure 6:
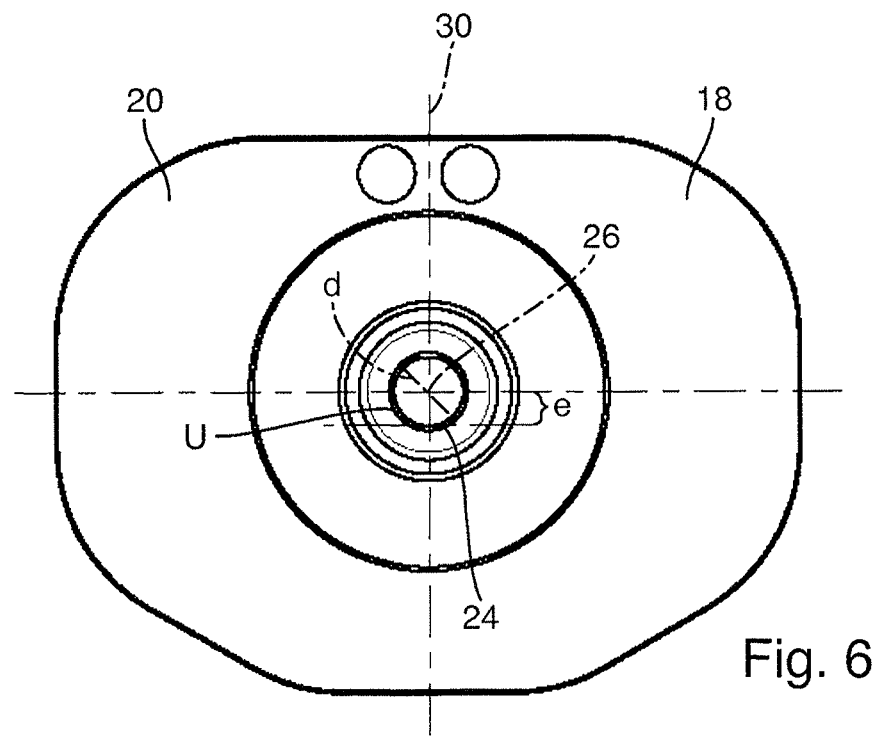
FIG. 6 is a view from below of the drawing according to FIG. 4.

In this case, the piston surface 20 comprises a centroid 24 that is spaced apart from the central longitudinal axis 26 of the piston rod 22. As can be seen in FIGS. 2 and 6, the centroid 24 of the piston surface 20 is inside the periphery u of the piston rod 22. The piston rod 22 is circular-cylindrical having a diameter d, the centroid 24 being spaced apart from the central longitudinal axis 26 by the spacing e of 2-10% of the diameter of the piston rod.

Figure 5:
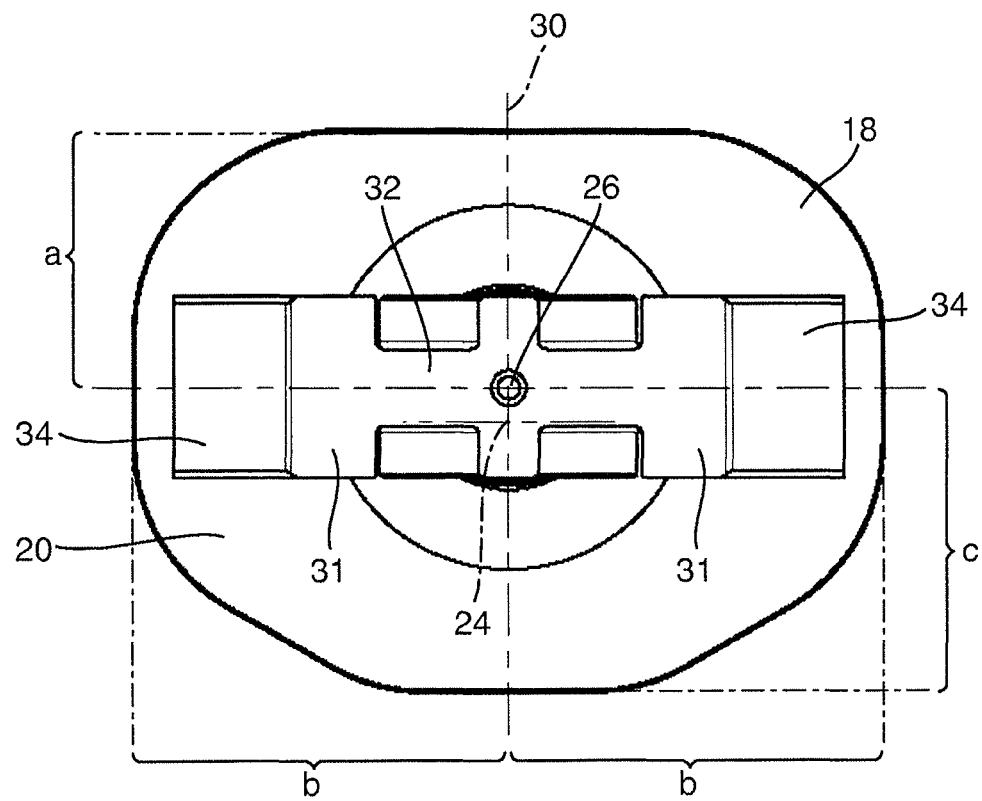
FIG. 5 is a plan view of the drawing according to FIG. 4.

As can be seen in particular from FIGS. 5 and 6, the piston 18 or the piston surface 20 has an axis of symmetry 30. The centroid 24 is therefore located on the axis of symmetry 30. The axis of symmetry 30 extends transversely with respect to the direction of movement 6 of the jaws 10. The centroid 24 is therefore spaced apart from the central longitudinal axis 26 transversely with respect to the direction of movement 6.

Figure 4:
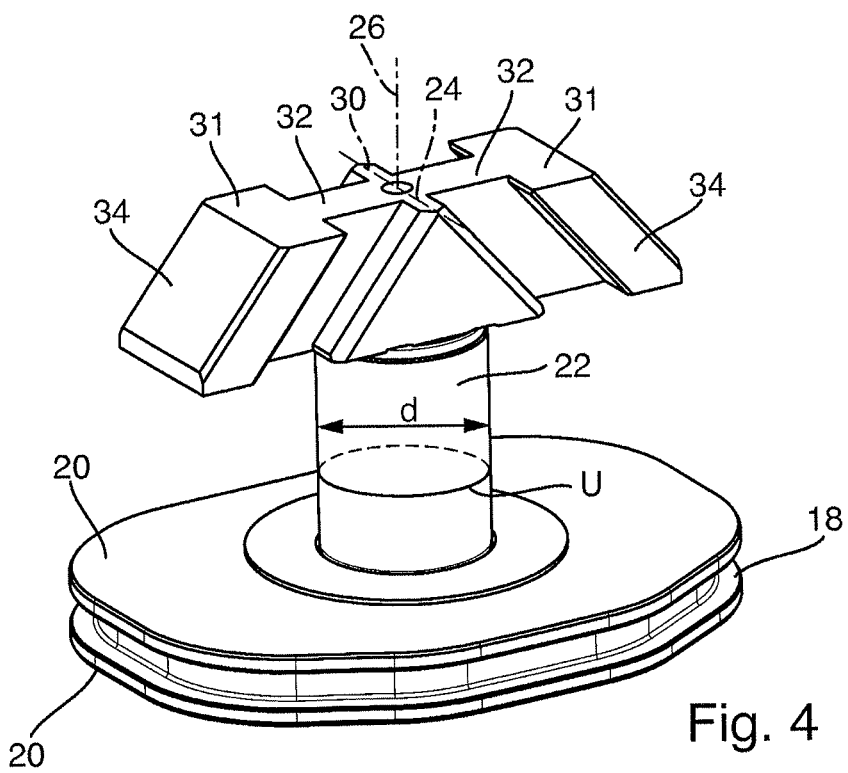
FIG. 4 shows a piston comprising a piston rod arranged thereon for the parallel gripper shown in FIGS. 1 to 3.

As can be seen in FIG. 4, two wedge hooks 31 that are mirror-symmetric with respect to the axis of symmetry 30 and each comprise a web portion 32 and a hook portion 34 are arranged on the piston rod 22. The wedge hooks 31 interact with corresponding guide slots in the gripper jaws 10 such that the gripper jaws 10 are coupled in terms of movement to the piston 18 by means of said wedge-hook transmission. The piston-cylinder unit comprising the piston 18 and the cylinder chamber 12 thus forms a hydraulic or pneumatic adjustment device for the gripper jaws 10.

The essential inventive concept is clear from FIGS. 1 and 2 and 5 in overview. Oval pistons are known from the prior art in which two short semi-major axes a and two long semi-major axes b are present in each case. In the present case, the piston surface 20 widens from an elliptical shape towards a small semi-major axis c. There are therefore two semi-major axes b of equal length in the direction of movement 6, while there is one shorter semi-major axis a and one longer semi-major axis c transversely with respect to the direction of movement 6. The presence of sensor slots 40 means that it is not possible, due to structural considerations, to widen the piston surface in the direction of the short semi-major axis a. Enlargement is possible in the direction of the semi-major axis c, however. This results in a movement of the centroid 24 away from the central longitudinal axis 26. However, this slight disadvantage is more than compensated for by the advantages relating to the piston force (piston force=piston surface×pressure) as a result of the enlargement of the piston surface 20.

What is claimed is:

1. Automation component comprising a basic housing, at least one jaw movably guided in a jaw guide of the basic housing and adapted for movement in a direction, a piston movably guided in the basic housing, and a piston rod having a longitudinal axis, wherein said piston comprises a piston surface on the piston rod side, said piston surface having a centroid and wherein said piston rod extends on the piston transversely with respect to said piston surface, the piston being coupled in terms of movement to the jaw, the centroid of the said piston surface being spaced apart from the central longitudinal axis of the piston rod, characterized in that the centroid is located in top view of said piston surface inside the periphery of the piston rod.

2. Automation component according to claim 1, characterized in that the basic housing comprises a cylinder that has a cylinder wall formed by the basic housing and in which the piston is movably guided.

3. Automation component according to claim 1, characterized in that the piston surface is asymmetrical.

4. Automation component according to claim 1, characterized in that the piston surface has an axis of symmetry, the centroid being located on the axis of symmetry.

5. Automation component according to claim 4, characterized in that the axis of symmetry extends transversely with respect to the direction of movement of the jaw.

6. Automation component according to claim 1, characterized in that the piston surface widens from an oval shape towards a small semi-major axis.

7. Automation component according to claim 1, characterized in that the piston rod is circular-cylindrical, and the centroid is spaced a distance from the central longitudinal axis that is from 2% to 10% of the diameter of the piston rod.

8. Automation component according to claim 1, characterized in that the piston has corners and a polygonal outer contour.

9. Automation component according to claim 8, characterized in that the corners are rounded.

10. Automation component according to claim 1, characterized in that the piston has an outer contour that describes a curve having a curvature according to at least one of the following:
 the curvature of which is aligned at every point, and
 the curvature of which is not zero at any point, and
 the curvature includes transitions having a constant tangent and/or a constant curvature and/or a constant curvature change.

11. Automation component according to claim 1, characterized in that the centroid is spaced apart from the central longitudinal axis in parallel with and/or transversely with respect to the direction of movement of the jaw.

12. Automation component according to claim 1, characterized in that the centroid is spaced apart from the central longitudinal axis in a direction parallel with or transversely with respect to a housing wall of the basic housing.

* * * * *